United States Patent
Schmidt et al.

(10) Patent No.: US 9,847,993 B2
(45) Date of Patent: Dec. 19, 2017

(54) METHOD AND SYSTEM FOR ACCESSING SERVICE/DATA OF A FIRST NETWORK FROM A SECOND NETWORK FOR SERVICE/DATA ACCESS VIA THE SECOND NETWORK

(71) Applicant: NEC Europe Ltd., Heidelberg (DE)

(72) Inventors: Mischa Schmidt, Heidelberg (DE); Hans-Joerg Kolbe, Darmstadt (DE); Raihan Ul-Islam, Leimen (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/400,707

(22) PCT Filed: Nov. 8, 2012

(86) PCT No.: PCT/EP2012/072125
§ 371 (c)(1),
(2) Date: Nov. 12, 2014

(87) PCT Pub. No.: WO2013/170913
PCT Pub. Date: Nov. 21, 2013

(65) Prior Publication Data
US 2015/0156191 A1    Jun. 4, 2015

(30) Foreign Application Priority Data
May 14, 2012 (EP) .................................... 12167938

(51) Int. Cl.
*G06F 7/04* (2006.01)
*H04L 29/06* (2006.01)
(Continued)

(52) U.S. Cl.
CPC ........ *H04L 63/083* (2013.01); *H04L 12/2812* (2013.01); *H04L 63/0428* (2013.01);
(Continued)

(58) Field of Classification Search
CPC ...................................................... H04L 63/083
(Continued)

(56) References Cited

U.S. PATENT DOCUMENTS

| 7,356,711 B1* | 4/2008 | Calinov ................ H04L 9/3226 713/180 |
| 2003/0120948 A1* | 6/2003 | Schmidt .............. H04L 63/0815 726/8 |

(Continued)

OTHER PUBLICATIONS

Fasbender, et al., "Virtually at home: High-performance access to personal media", Ericsson Review (INCL. ON), Telefonaktiebolaget LM Ericsson, SE, vol., 2008, No. 2, Jun. 19, 2008, pp. 58-63.

(Continued)

*Primary Examiner* — Peter Shaw
(74) *Attorney, Agent, or Firm* — Leydig, Voit & Mayer, Ltd.

(57) ABSTRACT

The present invention relates to a method for accessing service/data of a first network from a second network for service/data access via the second network, comprising the steps of a) Pairing of a user device with the first network, b) Attaching the user device to the second network, c) Authenticating the user device with the second network, d) Providing connectivity information for services/data of the first network to the second network, e) Providing available services/data information by the first network to the second network, f) Accessing a service and/or data of the first network by the second network. The present invention relates also to a system for accessing service/data of a first network from a second network for service/data access via the second network.

20 Claims, 7 Drawing Sheets

(51) Int. Cl.
  *H04W 12/06* (2009.01)
  *H04L 12/28* (2006.01)
  *H04W 84/12* (2009.01)
(52) U.S. Cl.
  CPC ............ *H04L 63/10* (2013.01); *H04W 12/06* (2013.01); *H04W 84/12* (2013.01)
(58) Field of Classification Search
  USPC .............................................................. 726/4
  See application file for complete search history.

(56) References Cited

U.S. PATENT DOCUMENTS

| | | | | |
|---|---|---|---|---|
| 2003/0208695 | A1* | 11/2003 | Soto et al. ..................... | 713/202 |
| 2004/0010682 | A1* | 1/2004 | Foster ................ | H04L 63/0823 713/156 |
| 2004/0128542 | A1* | 7/2004 | Blakley, III ........ | H04L 63/0281 726/12 |
| 2006/0218628 | A1* | 9/2006 | Hinton et al. .................... | 726/8 |
| 2007/0168458 | A1* | 7/2007 | Costa-Requena . | H04L 29/12009 709/217 |
| 2010/0080238 | A1 | 4/2010 | Allan et al. | |
| 2010/0138900 | A1* | 6/2010 | Peterka ............... | H04L 12/2812 726/4 |
| 2011/0296489 | A1* | 12/2011 | Fernandez Alonso .. | H04L 63/08 726/1 |
| 2012/0264402 | A1* | 10/2012 | Zhang ................. | H04L 63/0815 455/411 |

OTHER PUBLICATIONS

Olivier Dugeon, et al., "Extended UPnP Multimedia Content Delivery with an HTTP Proxy", Future Multimedia Networking, Springer Berlin Heidelberg, Berlin, Heidelberg, Jun. 17, 2010, pp. 87-99.

* cited by examiner

METHOD AND SYSTEM FOR ACCESSING SERVICE/DATA OF A FIRST NETWORK FROM A SECOND NETWORK FOR SERVICE/DATA ACCESS VIA THE SECOND NETWORK

The present invention relates to a method for accessing service/data of a first network from a second network for service/data access via the second network.

The invention relates also to a system for accessing service/data of a first network from a second network for service/data access via the second network.

Media consumption of a user is generally restricted to the user itself respectively a user's home environment, where the user keeps the corresponding devices for consuming media, for example for viewing premium television services. However, in case a user visits another user, for example for consuming together premium television services, like the football champions league final or the like the other user has no rights to view the premium television services. The user therefore would like to delegate his rights to the other user, so that consuming premium television services is possible in the other user's home environment.

To solve this problem currently the user brings his encryption card and/or set top box to the other user and connects it in the home of the other user. The user may then use the infrastructure of the other user together with his set top box, so that both users may consume the premium television services.

Alternatively the user may use identity management technologies: A user can then share its credentials or delegate its rights for services by explicitly interacting with a corresponding identity management system.

However, these options have certain drawbacks: One of the drawbacks is, that in particular the first option is complicated and circumstantial. Taking set top boxes to another environment may cause damage to the set top box, for example when carrying from a car to the other user's house during rain or the like. Another disadvantage is, that the conventional methods and techniques are limited respectively restricted to particular devices, in particular to said top boxes or the like. An even further disadvantage is that extensive user interaction is required.

It is therefore an objective of the present invention to provide a method and a system for accessing service/data of first network from a second network for service/data access via the second network, which is more feasible.

It is a further objective of the present invention to provide a method and a system for accessing service/data of a first network from a second network for service/data access via the second network, which is more user friendly.

It is an even further objective of the present invention to provide a method and a system for accessing service/data of a first network to a second network for service/data access via the second network which require less changes in conventional methods and systems.

According to the invention the aforementioned objectives are accomplished by a method of claim 1 and system of claim 23.

According to claim 1 the method for accessing service/data of a first network from a second network for service/data access via the second network is characterized by the steps:
a) Pairing of a user device with the first network,
b) Attaching the user device to the second network,
c) Authenticating the user device with the second network,
d) Providing connectivity information for service/data of the first network to the second network,
e) Providing available services/data information by the first network to the second network,
f) Accessing a service and/or data of the first network by the second network.

According to claim 23 the system for accessing service/data of a first network from a second network for service/data access via the second network preferably by performing a method according to one of the claims 1-22, is characterized by a first gateway and a first media server, located in the first network, a second gateway and a receiving terminal, located in the second network, a user device paired with the first network and configured to be operable to be attached to the second network and to authenticate with the second network and wherein the first gateway is configured go be operable to provide connectivity information for services/data of the first network to the second network and to provide available services/data information to the receiving terminal via the second gateway, and wherein the second gateway is configured to be operable to access a service and/or data and wherein the receiving terminal is configured to be operable to output the accessed service and/or data by the second network.

According to the invention it has been recognized that a simple and user friendly accessing of a service/data of a first network from a second network for service/data access via the second network is provided.

According to the invention it has further been recognized that an automatic executed access of service/data from a second network is possible.

According to the invention it has further been recognized that a good compatibility with existing protocols and infrastructure resulting in very few changes in the infrastructure is provided.

According to the invention it has further been recognized that an increased flexibility is accompanied with less user interaction.

The term "network" is preferably to be understood in a broad sense in the description, in particular in the claims: For example the first network may be provided in form of a service located within or at least reachable by a second network including hosted "cloud" storage services or subscription services in general.

Further features, advantages and preferred embodiments of the present invention are described in the following subclaims.

According to a preferred embodiment step c) is performed by IEEE 802.1x-based authentication and/or user name/password credentials at the second network, preferably web-based and/or via a captive portal. Technologies similar to web-based authentication and/or via captive portal may also be used. One of the advantages is, that by authenticating according to 802.1x unknown local users are enabled to be authenticated with the second network. If for example the authentication is performed via a captive portal a simple and reliable technique for authentication is provided.

According to a further preferred embodiment the authentication according to step c) is executed by querying one or more interconnected backend servers reachable within an operator network or connected to it. Backend servers—e.g. an AAA server—can be located within a telecommunication operator's network directly or it can be attached to or be reachable via the telecommunication operator's network. The term "AAA" means "authentication, authorization and accounting". Authentication related signaling can be proxied, relayed and interconnected among AAA servers and systems. This enables an easy-to-implement as well as a reliable authentication.

According to a further preferred embodiment the second network establishes indirect connectivity to the first network according to the provided connectivity information, preferably via an operator network. Indirect connectivity, preferably via an operator network, enables to use existing connectivity of the second network to contact the first network so that a direct communication between both networks, which is in most cases not possible, is not necessary.

According to a further preferred embodiment the first network is configured by an operator network infrastructure to accept connectivity requests. To accept connectivity from another network the first network is configured to be operable to accept connectivity requests from other networks. This configuration may be performed manually, automatically via appropriate signaling protocols, via an operator's network management infrastructure of the first network or via an operator's authentication infrastructure.

According to a further preferred embodiment the connectivity information is provided by the operator network. For example the connectivity information is sent from an authentication server in the operator network infrastructure to the second network when the user device attaches to the second network.

According to a further preferred embodiment a policy for providing and/or accessing service/data is defined, preferably the policy is preconfigured in the first network and/or provided by an operator network. This provides a flexible way to handle the access of service/data of a first network from a second network. The access to services of the first network may therefore be restricted by a policy which may be preconfigured in the first network or provided by an operator network. For example the policy is downloaded through the operator's management infrastructure to the first network or downloaded from the operator's authentication infrastructure to the first network.

According to a further preferred embodiment user confirmation is requested before performing step f). This enables in addition or alternatively to defining a policy to include user confirmation for accessing services/data. Thus, enabling user interaction when providing services/data of the first network by accessing them via the second network enhances security since explicit user confirmation is required when accessing services/data.

According to a further preferred embodiment the user confirmation is indicated by a notification message including information of available services/data and/or services/data requested for access. For example a user device may send a notification including information which services the second network tries to access and asks for user confirmation. The first network then might send given user confirmation to the second network indirectly via an operator network. For example the second network causes the first network to request premium television services that are then relayed from the first network to the second network to which the user device is attached.

According to a further preferred embodiment token/encryption information for services/data received from outside the first network are provided to the second network. This information may also preferably be used for step f). This optimizes traffic flow of the second network, since for example access to some of the first network services/data from the second network may be possible without direct or indirect data exchange for accessing the data of the first network. For example in case of premium television services only encryption information, for example encryption keys may then be provided or relayed to the second network for accessing the premium television services located in a media service network.

According to a further preferred embodiment a revocation message for revoking access to the services/data is provided, preferably by the user device itself, upon leaving the second network by the user device. This enables a simple and easy-to-implement revocation of access rights to the services/data of the first network when the user device attached to the second network leaves the second network. For example, the user device may therefore be configured to send an explicit revocation message to the first network when loosing the network coverage of the second network by conventional means or protocols.

According to a further preferred embodiment the revocation message is sent indirectly to the first network preferably via an operator network which sends revocation information to the first network for revoking access to the services/data. This enables alternatively and/or additionally to sending a revocation message directly to the first network an indirect revocation of access for the services/data of the first network. The revocation message may for example be sent to the authentication infrastructure of the operator network which in turn instructs the first network to revoke all service/data access of the second network. Additionally the user device and/or the authentication infrastructure of the operator's network may send a revocation message to any further involved service provider, for example for instructing him not to share anymore token/encryption information with the second network and/or to terminate services/data flows to the second network.

According to a further preferred embodiment step c) is performed repeatedly for continuous re-authentication of the user device with the second network. This enables to confirm on a regular basis that the second network is still eligible to consume services/data of the first network. Therefore security is enhanced.

According to a further preferred embodiment for communication between the first network and the second network token/encryption information and/or connectivity information is provided to these networks for a direct and secure communication between the two networks.

According to a further preferred embodiment the first and second network use the token/encryption information and/or the connectivity information for secure communication between these networks, preferably by SSL/TLS. This enables a secure communication between the first and second network.

According to a further preferred embodiment the token/encryption information is generated by an operator network and provided to the first and second network. This enables for example that a token or a security encryption key is generated by a centralized entity, for example by an authentication infrastructure of an operator network, and shared with both networks, for example through appropriate conventional mechanisms or techniques. This key or token is then used to secure/authenticate interaction between the first and second network. A time-consuming generation of token/encryption information on the user device and/or in the two networks is avoided.

According to a further preferred embodiment the user device is pre-authenticated with an operator network, wherein token/encryption information and/or connectivity information is provided to the operator network. When pre-authenticating the user device with an operator network token/encryption information and/or connectivity information generated by the first network and/or the user device may be sent to the operator network, so that this information may then be shared with a second network upon successful authentication of the user device in the second network. A time-consuming data transfer of token/encryption information and/or connectivity information after successful authentication of the user device is avoided.

According to a further preferred embodiment the policy is encoded into the token/encryption information. This enhances in particular steps e) and f), since policy information are provided together with the corresponding token/encryption information, so that fast accessing of a service and/or data is enabled.

According to a further preferred embodiment upon authentication of the user device with the second network, the operator network provides token/encryption information and/or connectivity information to the network. This enables the second network to automatically access in a secure way services/data of the first network.

According to a further preferred embodiment a security encryption key is generated on a random basis for the token/encryption information, preferably wherein the security encryption key is generated in form of a one time password. This enables a reliable and secure and well as simple way to generate a security encryption key.

According to a further preferred embodiment the token/encryption information and/or connectivity information is included in messages and/or requests of the RADIUS and/or DIAMETER protocol. For example messages of these protocols which may carry the token/encryption information and/or the connectivity information are the RADIUS CoA request, the RADIUS authentication response message and/or the DIAMETER re-Auth-request. This enables a simple and easy implementation in existing protocols. Within this embodiment, the second network may e.g. send an accounting start message to an AAA server after successful authentication of the user/device.

According to a further preferred embodiment the token/encryption information and/or connectivity information is exchanged among different operator networks, wherein each is connected to another of the at least two networks. This enables for example subscribers of different operators and/or internet service providers to use, i.e. access services/data from the first network, even if they are connected to different operator networks.

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawings FIG. 1 shows schematically a system according to a first embodiment of the present invention;

Figure 1:
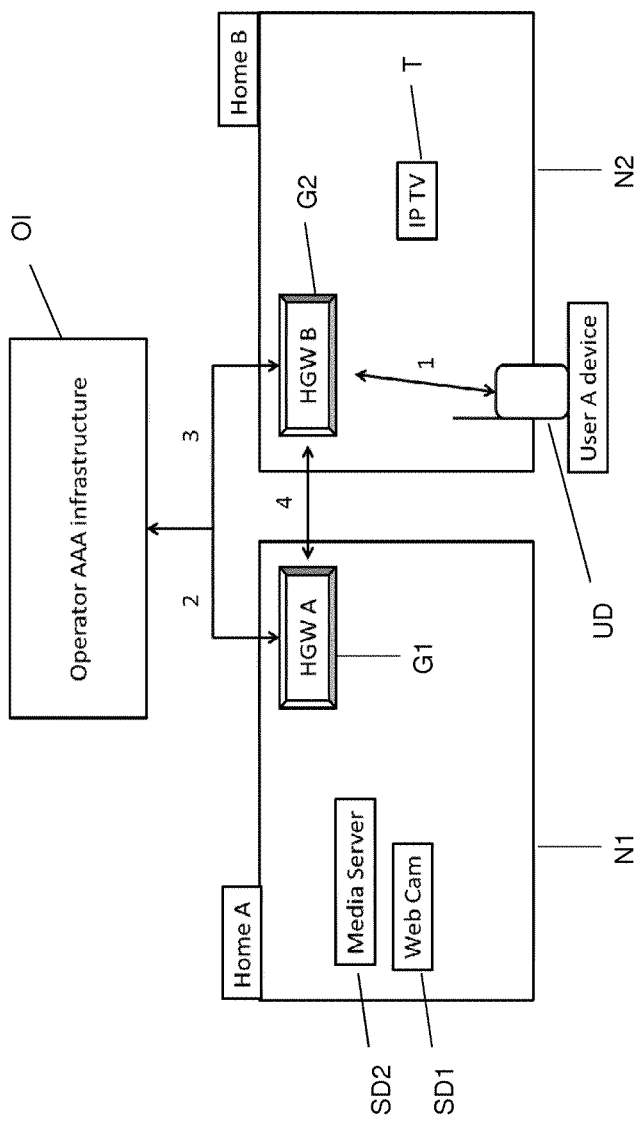
FIG. 1 shows schematically a system according to a first embodiment of the present invention.

In FIG. 1 a first network N1 and a second network N2 are shown. Both networks N1, N2 each comprise a home gateway G1, G2. In the first network N1 a webcam SD1 and a media server SD2 are located for providing services/data. The webcam SD1 as well as the media server SD2 are connected in the network N1 to the home gateway G1 of the first network N1. In the second network N2 a receiving terminal T in form of an IP television IPTV is shown. The IP television T is connected to the second home gateway G2 of the second network N2. Both home gateways G1, G2 are each connected to an operator authentication infrastructure, denoted with reference sign OI. A user device UD is paired with the first network, i.e. its home network. In FIG. 1 the user device UD is shown when attaching to the second network N2 via the gateway G2 of the second network N2.

The authentication of the first and second network N1, N2 with the operator authentication infrastructure is performed by using RADIUS or DIAMETER protocols via links between the corresponding home gateways G1, G2 and the operator authentication infrastructure OI, denoted with reference signs 2 and 3.

When a user A takes his paired personal device here the user device UD to the second network N2 as shown in FIG. 1 his user device UD authenticates in the second network N2 via a link to the home gateway G2 of the second network N2, denoted with reference sign 1, for example by using 802.1x authentication mechanisms via WLAN connectivity towards the home gateway G2 of a second network N2. In the following the home gateway G2 of the second network N2 interacts for the authentication of the user device UD with the operator authentication infrastructure OI. Upon successful authentication of the user device UD, token/encryption information as well as connectivity information and if applicable predefined policies are distributed by the operator authentication infrastructure OI to the corresponding gateways G1, G2 in the different networks N1, N2.

Subsequently the home gateway G2 of the second network N2 connects to the home gateway G1 of the first network N1 for accessing services/data available in the first network N1, which is denoted with reference sign 4. This link 4 may be established via the operator network OI, for example the internet. The home gateway G1 of the first network N1 then offers contents of the media server SD2 and/or of the webcam SD1 connected in the first network N1 to the second network N2 for consumption on the IPTV equipment T in the second network N2.

The term "gateway" is meant preferably in the description, in particular in the claims in a generic respectively generalized way: The gateway may also be a local server component, meaning that the function performed by the gateway may also be realized inside the respective network N1, N2 not only on the edge of the network.

Figure 2:
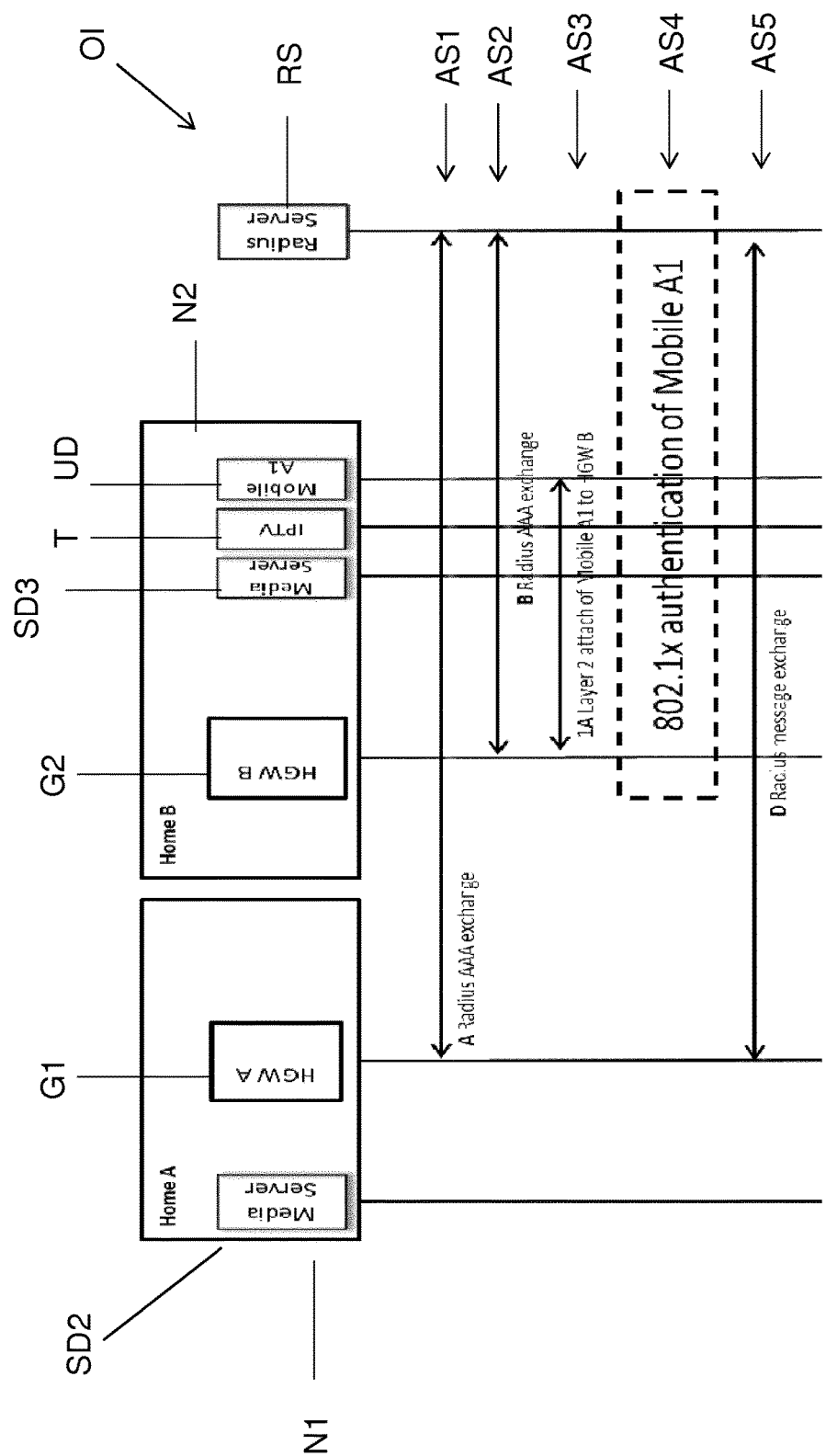
FIG. 2 shows an authentication of a user device according to a method of a second embodiment of the present invention.

FIG. 2 shows an authentication of a user device according to a method of a second embodiment of the present invention.

In FIG. 2 message flow examples for authentication signaling for authenticating the user device UD with the second network N2 is shown. The first network, denoted with reference N1 comprises a home gateway G1 and a media server SD2, the second network N2 comprises a home gateway G2, a media server SD3, a receiving terminal T in form of an IP television equipment as well as the attached user device UD, which is paired with the first network N1. The operator authentication infrastructure OI comprises a radius server RS.

Therefore if the first home gateway G1 establishes connectivity with the second home gateway G2, the networks N1 and N2 establish connectivity with each other.

In a first step AS1 the home gateway G1 of the first network N1 authenticates to the operator network OI by exchanging a RADIUS AAA exchange message with the radius server RS. In a second step AS2 the home gateway G2 of the second network N2 authenticates to the radius server RS of the operator infrastructure OI by exchanging a RADIUS AAA exchange message with the radius server RS. In a third step AS3 the user device UD attaches on network layer 2 to the home gateway G2 of the second network N2. The home gateway G2 of the second network N2 collaborates with the radius server RS to authenticate the user device UD for example by using 802.1 x in a fourth step AS4. The last message between the radius server RS and the home gateway G2 of the second network N2 for the authentication is a Radius Access-Accept packet carrying 802.1x related information. This message Access-Accept packet may be extended with connectivity information relating to the first network N1 and the security token/encryption key. Further the connectivity information relating to the first network N1 and the security token/encryption key may be sent in a separate radius message, for example within a radius CoA message subsequently.

In a fifth step AS5 the radius server RS informs the first network N1 that the paired user device UD is visiting the second network N2 and further optionally informs the home gateway G1 of the first network N1 of the security token/encryption key, for example with a radius CoA message.

Figure 3:
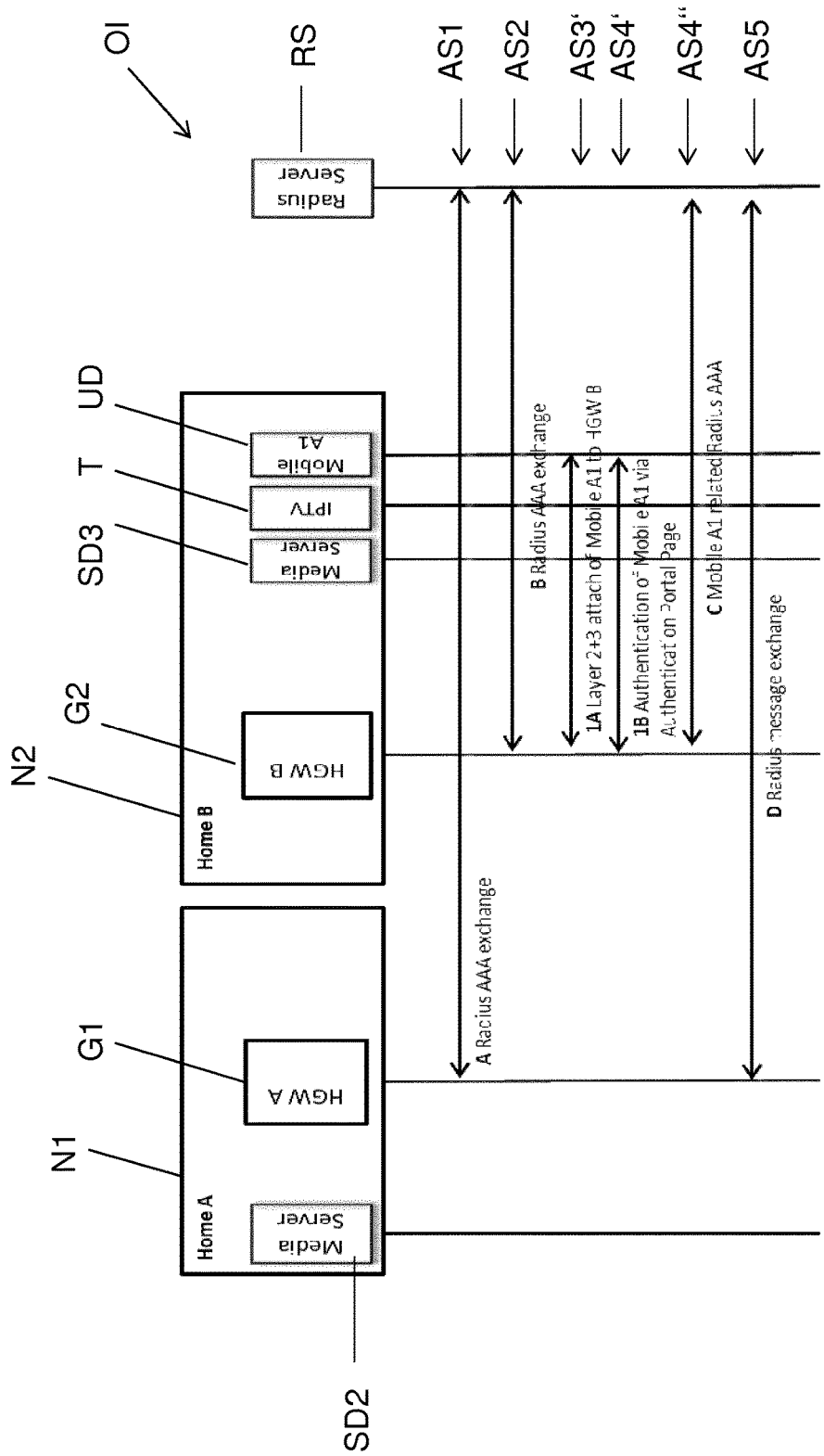
FIG. 3 shows an authentication of a user device according to a method of a third embodiment of the present invention.

FIG. 3 shows an authentication of a user device according to a method of a third embodiment of the present invention.

In FIG. 3 in general is shown the same authentication signaling corresponding to FIG. 2. The first and second step AS1 and AS2 are the same as in FIG. 3. In a third step AS3' the user device UD attaches to the home gateway G2 of the second network N2 on a network layer 2 and layer 3, therefore receiving IP level access. In a fourth step AS4', the user device UD authenticates to the home gateway G2 of the second network N2 using an authentication portal. This may be user-triggered or automatically triggered, for example by means of a captive portal. In a further step AS4" the home gateway G2 of the second network N2 fetches authentication information related to the user device UD via the radius server RS in the operator infrastructure OI, for example for CHAP challenge/response procedures. The authentication response from the radius server RS to the home gateway G2 of the second network N2 carries connectivity information of the first network N1 as well as the security token/encryption key. Alternatively a Radius CoA message may be used after to provide the connectivity information of the first network N1 as well as the security token/encryption key instead of the authentication response. The fifth step AS5 corresponds to the step AS5 of FIG. 2.

Figure 4:
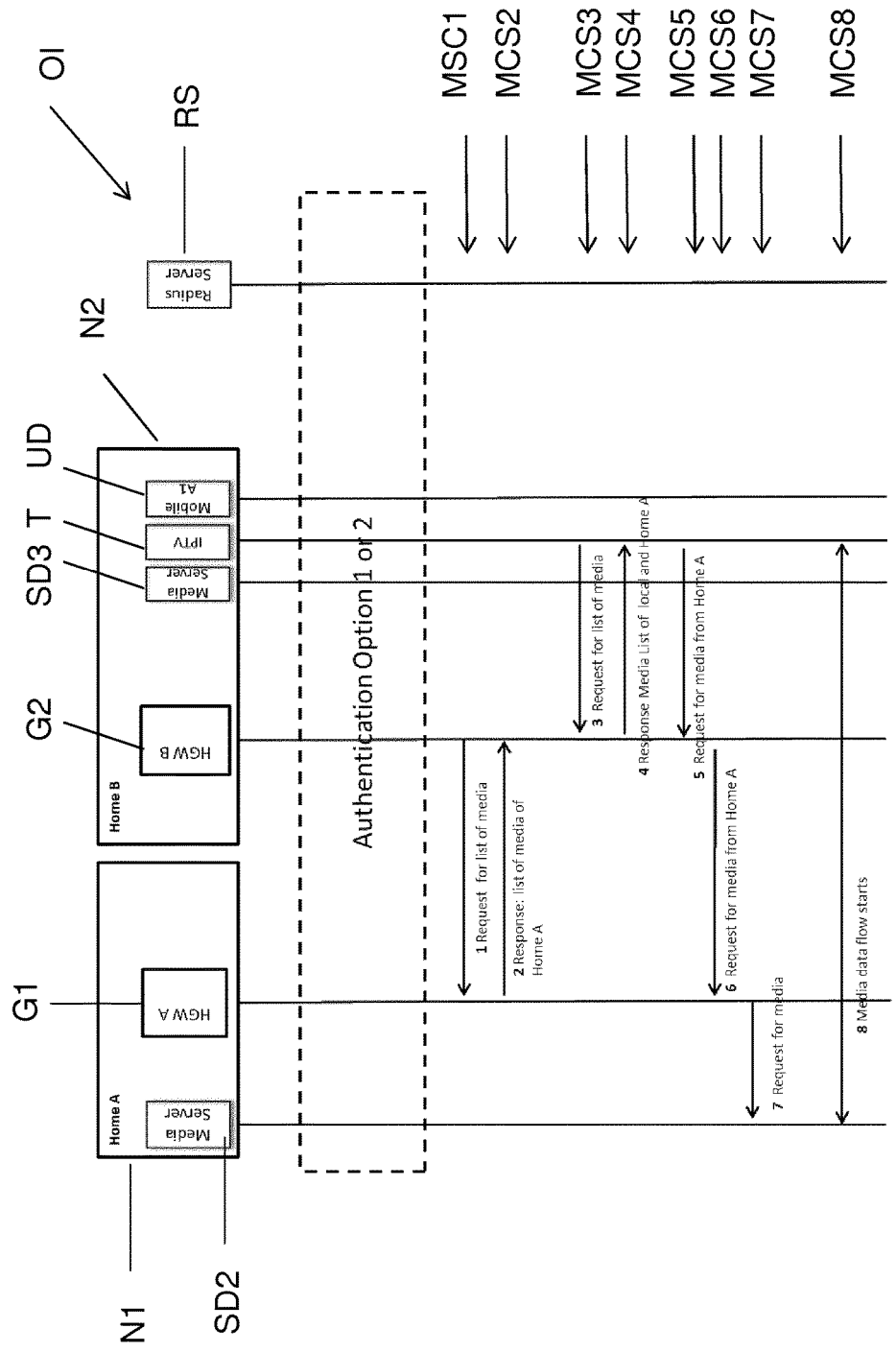
FIG. 4 shows services/data access according to a method of a fourth embodiment of the present invention.

FIG. 4 shows services/data access according to a method of a fourth embodiment of the present invention.

In FIG. 4 signaling flow describing consuming media services subsequent to successful authentication of the user device UD in the second network N2 with one of the authentication procedures according to FIG. 2 or 3 is shown.

In a first step MCS1 the home gateway G2 of the second network N2 requests a list of available media from the home gateway G1 of the first network N1 after receiving connectivity information of the first network N1. The security token/encryption key distributed by the radius server RS may be inserted by the home gateway G2 of the second network N2 in this request for example by including it into the HTTP header or as an URL parameter. Alternatively or in addition to that, the communication between the first network N1 and the second network N2 may be encrypted using the aforementioned security token/encryption key.

In a second step MCS2 the home gateway G1 of the first network N1 looks up available media in the first network N1 and responds with a corresponding list together with connectivity information to the home gateway G2 of the second network N2. The list of accessible media may be filtered based on user preference settings. Further it is possible that the home gateway G1 of the first network N1 checks the security token/encryption key which the home gateway G2 of the second network N2 supplied in his request for accessing media. In a third step MSC3 the IP television T sends a request for a list of available media to the home gateway G2 of the second network N2 and in a fourth step MCS4 the home gateway G2 of the second network N2 responds with a corresponding list of accessible media encompassing accessible media received from the first network N1. The list of media may be encompassed among others.

In a fifth step MCS5 the IP television T requests from the home gateway G2 of the second network N2 the media of the first network N1. In a sixth step MCS6 the home gateway G2 of the second network N2 then requests the requested media from the home gateway G1 of the first network N1. The security token/encryption key may be inserted in the request of the sixth step MCS6 by appropriate means, for example by including it into the HTTP header or as an URL parameter. In a seventh step MCS7 the home gateway G1 of the first network N1 requests the media from the local media server SD2 in the first network N1. Preferably the home gateway N1 of the first network N1 first verifies the security token/encryption key received in the request of the second network N2.

In an eighth step MCS8 the media server SD2 in the first network N1 delivers the media to the IPTV T in the second network N2.

Figure 5:
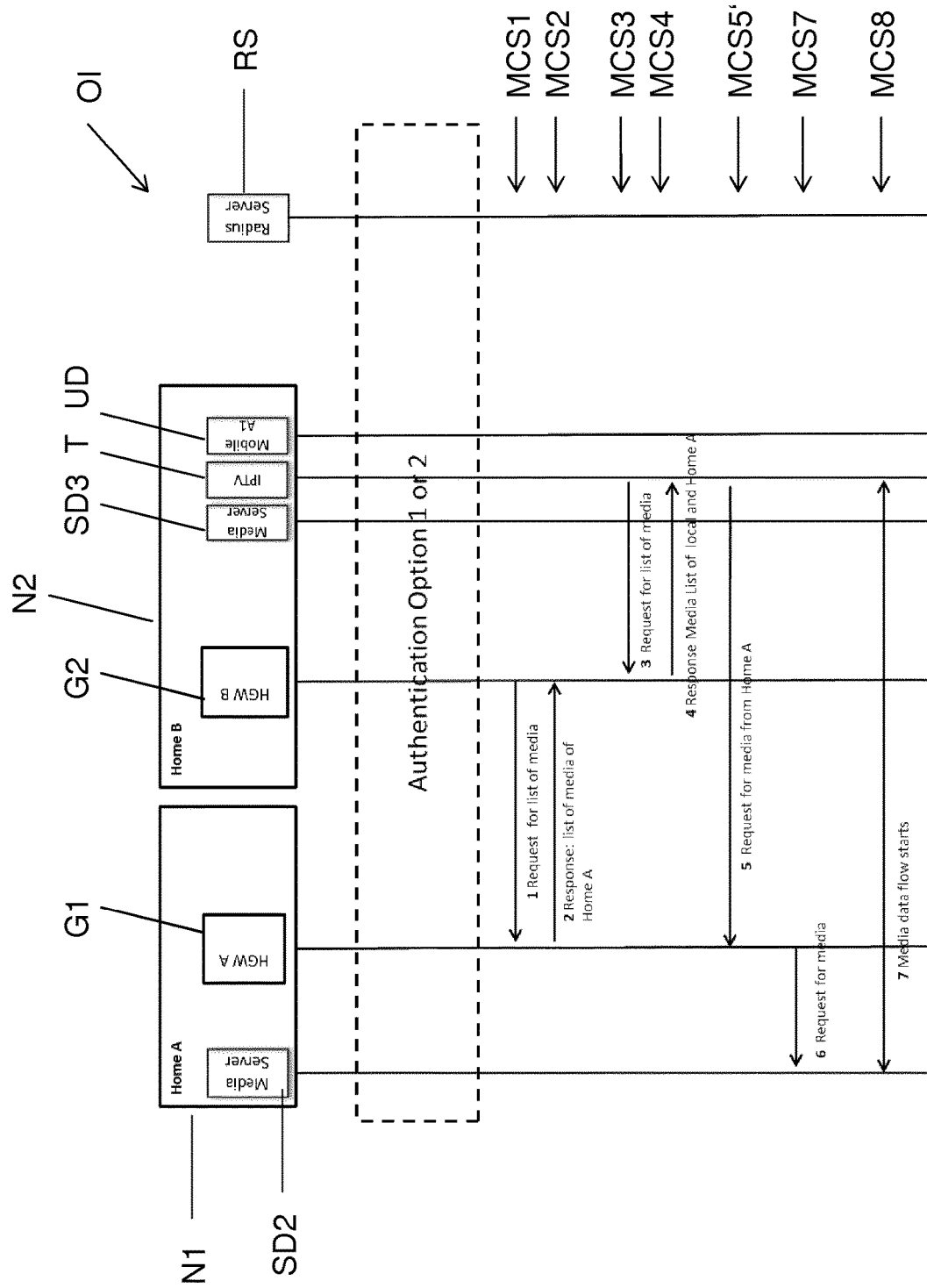
FIG. 5 shows services/data access according to a method of a fifth embodiment of the present invention.

FIG. 5 shows services/data access according to a method of a fifth embodiment of the present invention.

In FIG. 5 an alternative signaling flow for consuming media service subsequent to successful authentication of the user device UD in the second network N2 with one of the authentication procedures according to FIG. 2 or 3 is shown. FIG. 5 is in general similar to FIG. 4. However instead of the steps MCS5 and MCS6 FIG. 5 shows only one step MCS5'. In the step MCS5' the IPTV T directly communicates with the home gateway G1 of the first network N1 for requesting the media presented or provided in the media list according to the fourth step MCS4. The further steps MCS7 and MCS8 as well as the first four steps MCS1-MCS4 correspond to the steps MCS1-MCS4 and MCS7-MCS7 according to FIG. 4.

Figure 6:
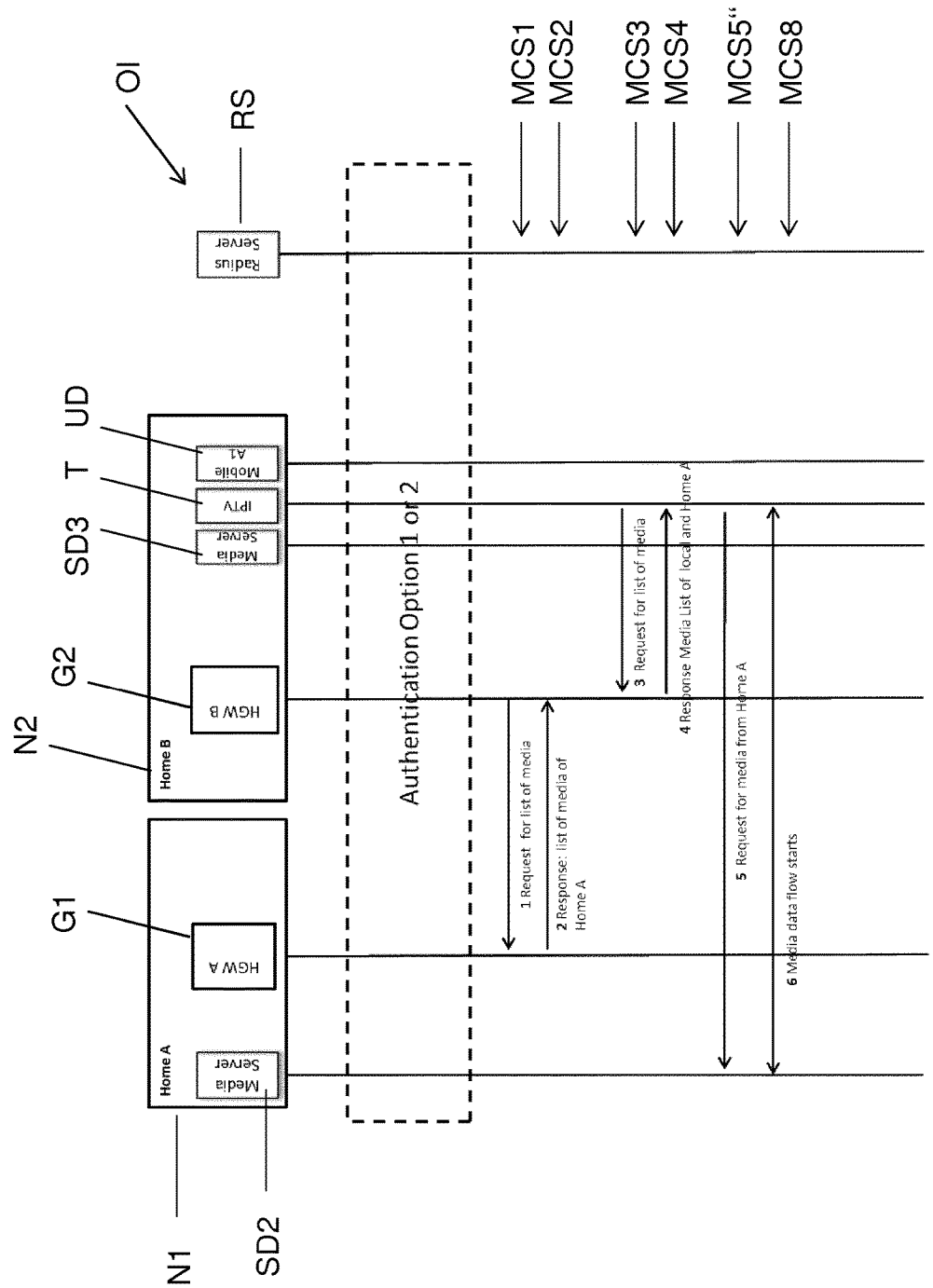
FIG. 6 shows services/data access according to a method of a sixth embodiment of the present invention.

FIG. 6 shows services/data access according to a method of a sixth embodiment of the present invention.

In FIG. 6 a further alternative signaling flow for consuming media services subsequent to successful authentication of the user device UD in a second network N2 with one of the authentication procedures according to FIG. 2 or 3 is shown.

The signaling flow according to FIG. 6 is similar to the signaling flow of FIG. 5. However, the steps MCS5' and MCS7 of FIG. 5 are replaced by one step MCS5" allowing the IPTV T in the second network N2 to directly communicate with the media server SD2 in the first network N1 for requesting the media presented or provided in the list according to step MCS4. The steps MCS1-MCS4 as well as MCS8 are the same as in FIG. 4 respectively 5.

Figure 7:
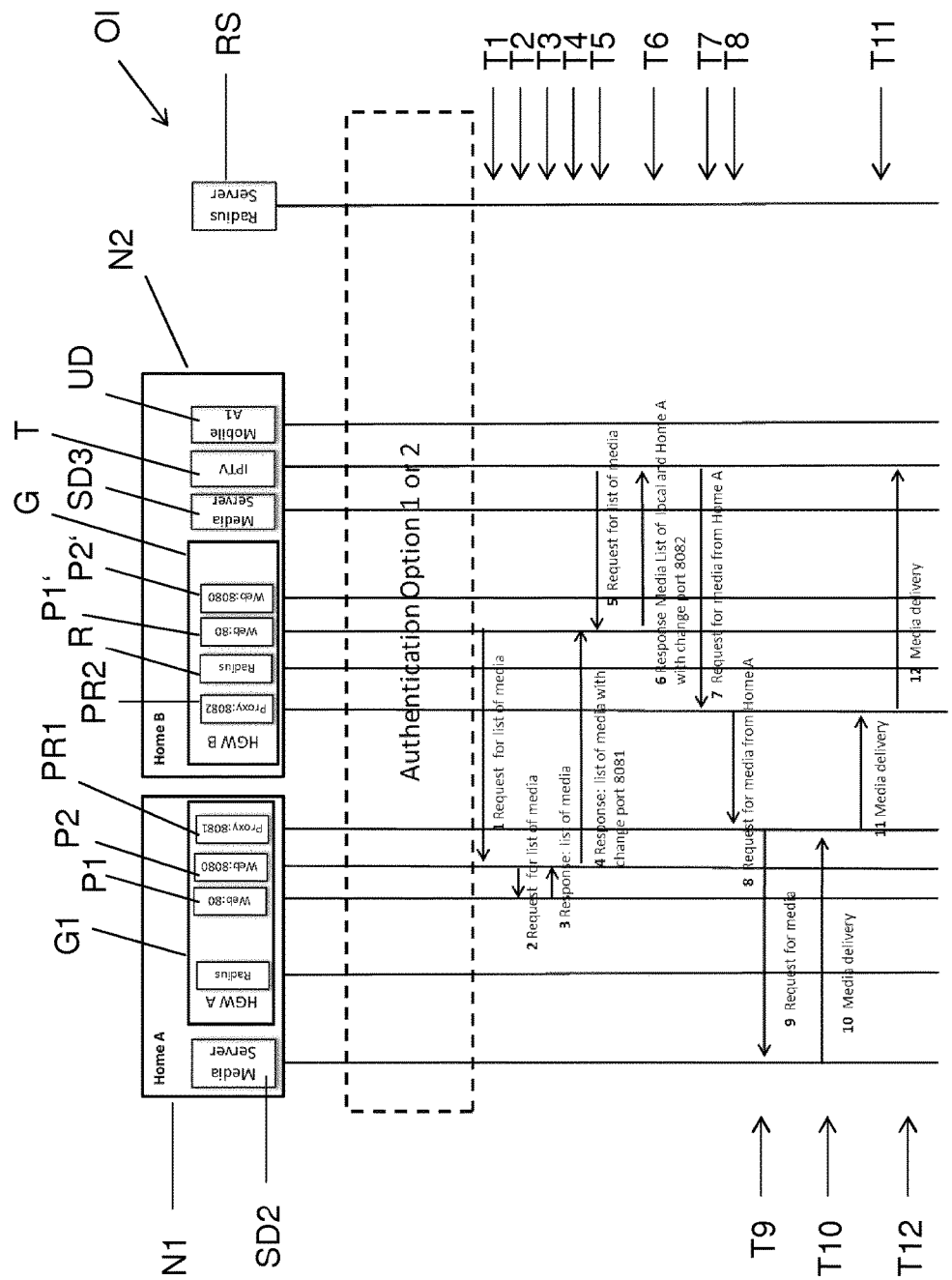
FIG. 7 shows services/data access according to a method of a seventh embodiment of the present invention.

FIG. 7 shows services/data access according to a method of a seventh embodiment of the present invention.

FIG. 7 shows a signaling flow when consuming media services subsequent to successful authentication of the user device UD in a second network N2 with one of the authentication procedures according to FIG. 2 or 3 including proxy instances.

After receiving connectivity information of the first network N1, the home gateway G2 of the second network N2 on port 80 denoted with reference sign P1' requests a list of available media from the home gateway G1 of the first network N1 at the corresponding HTTP server port indicated in the connectivity information in a first step T1. In FIG. 7 port 8080 in the home gateway G1 is used, denoted with reference sign P2. The security token/encryption key distributed to the radius server RS may be inserted by the home gateway G2 of the second network N2 in this request by appropriate means, for example by inserting it into the HTTP header or as an URL parameter.

In a second step T2 the proxy component of the home gateway G1 translates the request into a request to the local home gateway web portal with port 80, denoted with reference sign P1 to request a list of available media. The proxy component may check the security token/encryption key supplied by the home gateway N2 in the request for media and may reject the connectivity request if necessary. In the third and fourth step T3, T4 the home gateway G1 or the first network N1 looks up the accessible media and responds with the corresponding list with connectivity information to the home gateway G2 of the second network N2. In the fourth step T4 the proxy component changes the connectivity details of the media returned to the home gateway G2 of the second network N2 to refer to a dedicated media server proxy component on the home gateway G1 of the first network N1. Port 8081 denoted with reference sign PR1 is used in FIG. 7. Alternatively the media connectivity details may point to the proxy component itself on port 8080 denoted with P2'.

In the fifth and sixth step T5 and T6 at a subsequent point of time the IPTV T within the second network N2 requests the list of available media from the home gateway media portal which is denoted with reference sign P1' corresponding to port 80 on the home gateway G2 in FIG. 7. The IPTV T receives a list of media encompassing, potentially among others, the media from the first network N1. The home gateway media portal P1' changes media connectivity information, i.e. the HTTP links of the media from the first network N1 to refer to a local media server proxy corresponding to port 8082 denoted with PR2 on the home gateway G2 of the second network N2 in FIG. 7. In a second step T7 the IPTV T selects a piece of media from the first network N1, i.e. sends a request for media of the first network N1 to the server proxy PR2 on the gateway G2 of the second network N2, i.e. port 8082 on the home gateway G2 of the second network N2 in FIG. 7.

In an eighth step T8 the media server proxy PR2 of the home gateway G2 of the second network N2 looks up the requested media and requests the media from the home gateway G1 of the first network N1 at the previously indicated media server proxy port PR1, i.e. port 8081 on the home gateway G1. The security token/encryption key distributed through the radius server RS may be inserted by the home gateway G2 of the second network N2 in this request by appropriate means, for example by including it into a HTTP header or as an URL parameter.

In a ninth step T9 the media server proxy PR1 of the home gateway G1 of the first network N1 looks up the requested media ad requests the media from the local media server SD2. The media server proxy PR1 of the home gateway G1 of the first network N1 may first verify the security token/encryption key received in the request from the home gateway G2 of the second network N2. In a tenth step T10 the media server SD2 delivers the requested media to the local media server proxy PR1 of the home gateway G1 of the first network N1. In an eleventh step T11 the media server proxy PR1 of the home gateway G1 of the first network N1 delivers then the media to the local media server proxy PR2 of the home gateway G2 of the second network N2. In a twelfth step T12 the media server proxy PR2 of the home gateway G2 of the second network N2 delivers the media to the IPTV T.

The steps T10, T11 and T12 may be interleaved, for example step T11 may start once a part of the requested media has been received in the proxy component PR1 of the home gateway G1 of the first network N1 instead of waiting for receiving the complete media item requested.

In summary the present invention provides a novel mechanism to delegate service access rights to another user/subscriber in a user friendly and automated way.

The present invention further provides a simple, user-friendly automated and secured delegation of service and data access rights/access services hosted, for example in a residential home network made accessible in a visited residential other network. The present invention is compatible with existing authentication protocols and infrastructure. Centralized authentication infrastructure of operators enables secure/authenticated distributed services between different subscribers. Further the present invention is feasible and may be used on widely deployed components. An even further advantage is, that the present invention allows running services over the top by adding devices in residential homes and an authentication server infrastructure. The present invention provides a high user convenience since for example no passwords and/or IP addresses need to be remembered to access services/data from a network other then the home network.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The term "network" is not limited in the description, preferably in the claims. The term "network" is preferably to be understood in a broad sense: For example the first network may be provided in form of a service located within or at least reachable by a second network including hosted "cloud" storage services or subscription services in general. The term network includes also in particular cloud networks. Also the present invention is not limited to a pairing of the user device to one network, in particular to one gateway only. Of course the user device may be paired with different gateways of different networks simultaneously.

The invention claimed is:

1. A method for accessing services or data of a network, the method comprising:
   a) registering a user device to access services or data of a first network;
   b) connecting the user device to a second network;
   c) authenticating the user device with the second network subsequent to the registering of the user device with the first network;
   d) providing connectivity information for the services or data of the first network to the second network;
   e) providing the services or data by the first network to the second network; and
   f) accessing, based on the registering and the authenticating, the services or data of the first network by the second network,
      wherein the user device is pre-authenticated by an operator network and the operator network provides token and encryption information to the second network to authenticate the user device, and
      wherein the operator network interfaces with both the first network and the second network, and the first network and the second network are unable to communicate with each other until the operator network facilitates communication between the first network and the second network based on the user device being registered to access the services or data of the first network prior to being authenticated with the second network.

2. The method according to claim 1, wherein step e) is performed by at least one of IEEE 802.1x-based authentication or username/password credentials at the second network.

3. The method according to claim 2, wherein the authentication procedure according to step c) is executed by querying one or more inter-connected backend servers reachable within the operator network or connected to it.

4. The method according to claim 1, wherein the second network establishes indirect connectivity to the first network according to the provided connectivity information.

5. The method according to claim 1, wherein the first network is configured by the operator network infrastructure to accept connectivity requests.

6. The method according to claim 1, wherein the connectivity information is provided by an operator infrastructure.

7. The method according to claim 1, wherein a policy for providing or accessing the services or data is defined.

8. The method according to claim 1, wherein user confirmation is requested before performing step f).

9. The method according to claim 8, wherein the user confirmation is indicated by a notification message including at least one of information of one or more available services or data or one or more services or data requested for access.

10. The method according to claim 1, wherein the operator network is outside the first network.

11. The method according to claim 1, wherein a revocation message for revoking access to the services or data is provided by the user device.

12. The method according to claim 1, wherein for communication between the first and the second network, token and encryption information or the connectivity information is provided to these networks.

13. The method according to claim 12, wherein the first and the second network use the token and encryption information or the connectivity information for secure communication between the first and second network.

14. The method according to claim 12, wherein the token and encryption information is generated by the operator network and provided to the first network.

15. The method according to claim 12, wherein the token and encryption information or the connectivity information is provided to the operator network.

16. The method according to claim 15, wherein upon authentication of the user device with the second network the operator network provides the token and encryption information or the connectivity information to the first and second network.

17. The method according to claim 1, wherein for the token and encryption information a security encryption key is generated on a random basis.

18. The method according to claim 1 wherein the token and encryption information or connectivity information is included in messages or requests of a RADIUS or DIAMETER protocol.

19. The method according to claim 1, wherein the token and encryption information or the connectivity information is exchanged among different operator networks, and wherein each operator network is connected to one or more of the first network or the second network.

20. A system for accessing services or data of a network, the system comprising:
   a first gateway and a first media server, located in a first network,
   a second gateway and a receiving terminal, located in a second network,
   a user device registered to access services or data of the first network and configured to be operable to connect to the second network and to authenticate with the second network after being registered with the first network, and wherein the first gateway is configured to be operable to provide connectivity information for services or data of the first network to the second network and to provide the services or data to the receiving terminal via the second gateway, and wherein:
   the second gateway is configured to be operable to access, based on the user device being registered with the first network and authenticated with the second network, the service or data of the first network and wherein the receiving terminal is configured to be operable to output the service or data by the second network,
   the receiving terminal is pre-authenticated by an operator network and the operator network provides token and encryption information to the second network to authenticate the receiving terminal, and
   the operator network interfaces with both the first network and the second network, and the first network and the second network are unable to communicate with each other until the operator network facilitates communication between the first network and the second network based on the user device being registered to access the services or data of the first network prior to being authenticated with the second network.

* * * * *